(12) United States Patent
Newport

(10) Patent No.: US 6,754,564 B2
(45) Date of Patent: Jun. 22, 2004

(54) INTEGRATED VEHICLE INFORMATION SYSTEM

(76) Inventor: Archie L. Newport, 10775 N. Bayshore Dr., Miami, FL (US) 33161

( * ) Notice: Subject to any disclaimer, the term of this patent is extended or adjusted under 35 U.S.C. 154(b) by 184 days.

(21) Appl. No.: 09/771,607

(22) Filed: Jan. 30, 2001

(65) Prior Publication Data

US 2002/0103577 A1 Aug. 1, 2002

(51) Int. Cl.⁷ .............................................. G06F 19/00
(52) U.S. Cl. ............................. 701/1; 701/35; 307/10.5
(58) Field of Search .............................. 701/29, 35, 33; 340/426, 438, 5.23, 5.3, 5.65; 307/10.5; 707/200

(56) References Cited

U.S. PATENT DOCUMENTS

| | | | |
|---|---|---|---|
| 5,839,112 A | * 11/1998 | Schreitmueller et al. | 345/764 |
| 5,844,987 A | * 12/1998 | Matthews et al. | 340/901 |
| 6,052,065 A | 4/2000 | Glover | 340/10.42 |
| 6,070,164 A | 5/2000 | Vagnozzi | 707/100 |
| 6,076,026 A | 6/2000 | Jambhekar et al. | 701/35 |

* cited by examiner

*Primary Examiner*—Tan Q. Nguyen

(57) ABSTRACT

An integrated vehicle information system (10) which utilizes a vehicle identification number (12) having segments of vehicle identification number make (12A), vehicle identification number model (12B), vehicle identification number engine (12C), vehicle identification number year (12D), and vehicle identification number factory sequence number (12E) to identify information about a particular vehicle stored in a database.

7 Claims, 18 Drawing Sheets

12

| 12A | 12B | 12C | 12D | 12E |
|---|---|---|---|---|
| 3FA | FP15 | PL | WR | 201205 |

The Integrated Vehicle Information System, Consists of configurations of Fields, Values and Rules that are applied to the first ten digits to the Vehicle Identification Number (VIN), a series of expressions are representative of the form, position = contents. Classification Derivations Screens enable the user to define various combinations of the first ten digits of the V.I.N. and apply them to specific fields: After specifying which field rule is to be defined, a value is applied indicating the conditions under which that value applies. Position indicators always appear before the equals sign, and VIN characters appear after the equals sign. The notation: 1=3 means that position 1 contains a digit 3.

Position values of the VIN are identified in Rule Definition Configuration tables below.

| FIELD | CLASSIFICATION RULE | VALUE |
|---|---|---|
| 1-Nation of Origin | 1=3 | 3=Mexico |
| 2-Make 12A | 2=F | F=Ford |
| 3-Vehicle Type | 3=A | A= Passenger Car |
| 4-Restraint System | 4=B | B= Active Seat Belts Front & Rear |
| 5-Chassis (Make) | 5=P | P= Chassis |
| 6-Model 12B | 6=1 | 1= Escort |
| 7-Body | 7=5 | 5= Station Wagon 4Dr LX |
| 8-Engine 12C | 8=P | P= 121CI 2.0L L4 EFI |
| 9-VIN check Digit | 9=L | L= Constant for all cars |
| 10-Year 12D | 10=W | W= 1998 |
| 11-Assembly Plant Code | 11=R | R= Place of manufacture |
| 12-17 Sequence number 12E |  | 12-17=100,001 – 599,999 Ford Division |

1=3
1-3=3FA
6-7=13/14/15

| | |
|---|---|
| A 1998 Ford is represented by: | 1-3=3FA & 10=W |
| Add 15 Chassis & model | 1-3=3FA & 6-7=15 |
| Add 8 Engine | 1-3=3FA & 6-7=15 & 8=P |
| Add 10 Year | 1-3=3FA & 6-7=15 & 8=P & 10=W |
| Add all Escort Chassis, Models, Engine & Years | 1-3=3FA & 6-7=13/14/15 & 8=P & 10=W/X/Y/1/2 |
| Or it could read | 2-3=FA & 6=1 & 7=3/4/5 & 8=P & 10=W/X/Y/1/2 |

Rule Configuration for the above VIN# 1-3=3FA & 4=B & 5-7=P15 & 8=P & 10=W.

(Note that the number of characters in each subfield following the equals sign must match the number of columns indicated before the equals sign.)

More complex expressions may be created using the symbols & (and) and I (or).

Using the & operator for 2-3=FA Ford PC &
2-3=ME Mercury PC & 6=1 Model/Chassis and
10=Years 98,99,2000   reads as                                          2-3=FA/ME & 6=1 & 10=W/X/Y Using the & (and) and I (or) operator,
FA=Ford PC or ME=Mercury PC
6=1(Chassis), 10=W/X/Y (year).                              2-3=FA & 6=1 & 10=W/X/Y I 2-3=ME & 6=1 & 10=W/X/Y Note that & operators normally are evaluated before I operators. However, parentheses may be used to alter the order in which &s and Is are evaluated. Spaces within rules have no significance.

Fig. 2A

As in the selection rules used for parts and labor, rule variables may be used within rules.
Example, if we define a variable Ford as "2-3=FA", some of the above lines might have been written as:

| FIELD  | RULE         | VALUE           |
|--------|--------------|-----------------|
| Make   | %Ford        | Ford            |
| Model  | %Ford & 6=1  | Escort          |
| Model  | %Ford & 6=4  | Mustang         |
| Model  | %Ford & 6=5  | Taurus          |
|        |              |                 |
| Engine | %Ford & 8=P  | 121CI 2.0L L4 EFI |
| Engine | %Ford & 8=S  | 182CI 3.0L V/6 EFI |
| Engine | %Ford & 8=N  | 207CI 3.4L V/8 EFI |

Fig. 2B

```
           12A          12B         12C    12D              12E
  12    (1) (2) (3) (4) (5) (6) (7) (8) (9) (10) (11) (12 13 14 15 16 17)
  Vin#   3  F  A  B  P  1  5  P  L  W   R   2  0  1  2  0  5
```

| FIELD | CLASSIFICATION RULE | VALUE |
|---|---|---|
| 1-Nation of Origin | 1=3 | 3=Mexico |
| 2-Make 12A | 2=F | F=Ford |
| 3-Vehicle Type | 3=A | A=Passenger Car |
| 4- Restraint System | 4=B | B=Active Seat Belts F & R |
| 5-Chassis (Make) | 5=P | P=Chassis |
| 6-Model 12B | 6=1 | 1=Escort |
| 7-Body | 7=5 | 5=Station Wagon 4Dr LX |
| 8-Engine 12C | 8=P | P=121CI 2.0L L4 EFI |
| 9-V.I.N. Check Digit | 9=L | L=Constant for all Cars |
| 10-Year 12D | 10=W | W=1998 |
| 11- Assembly Plant | 11=R | R=Place of manufacture |
| 12-17=Production Sequence Number 12E | | 12–17 100,001–599,999 Ford Division |

Fig. 3

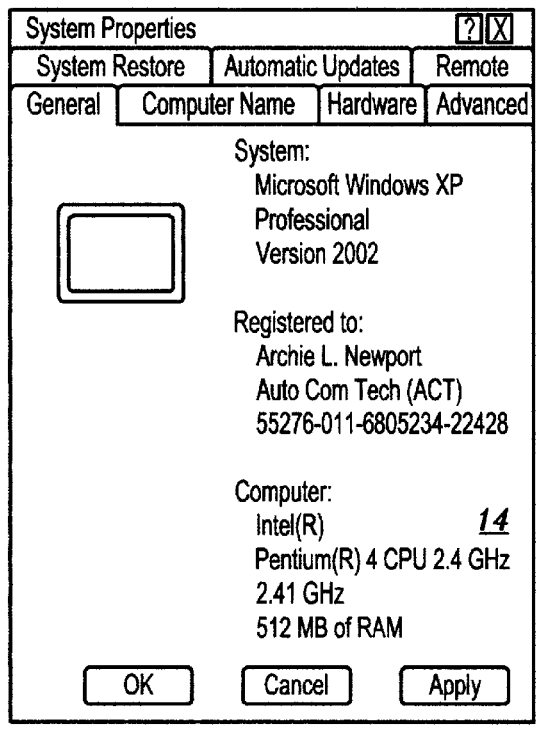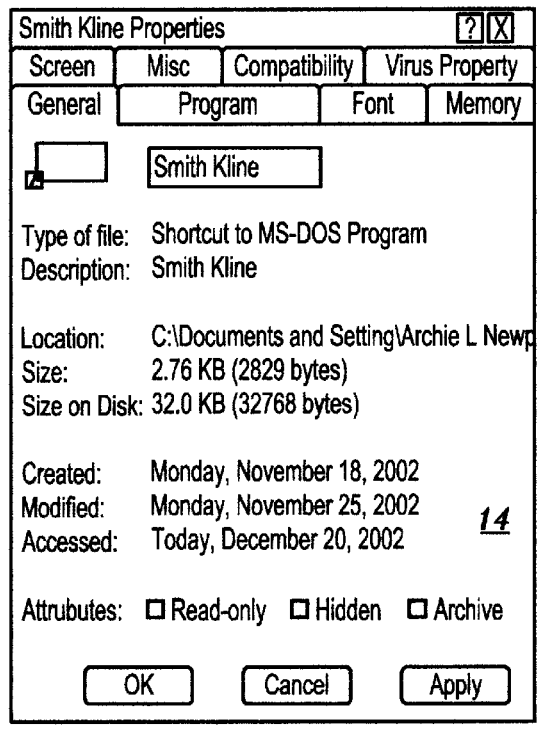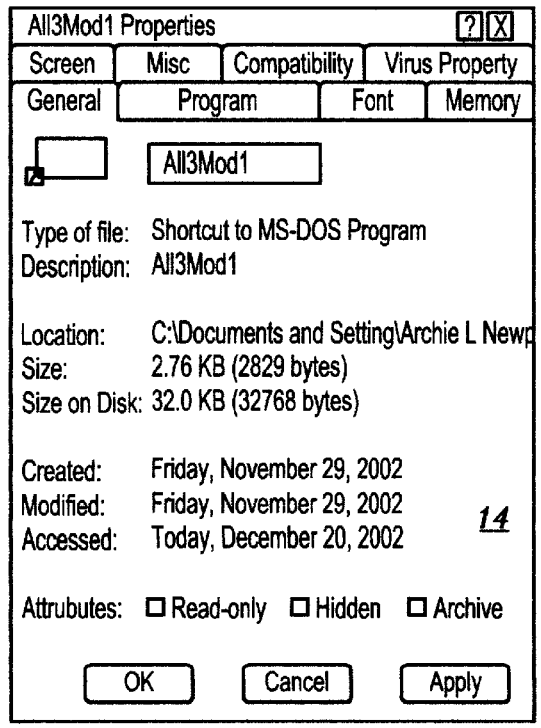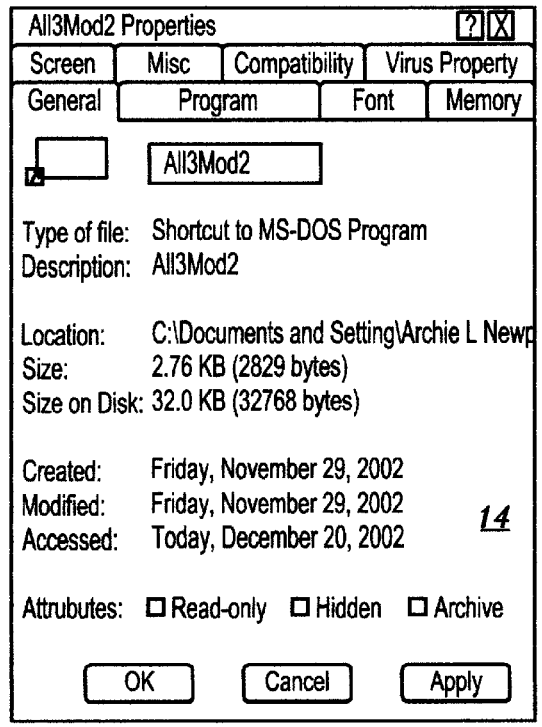
Fig. 4

FMW010 - Fleet Maintenance

Purchase Information — 14A
- Date
- Price
- Mileage

Lease Information — 14B
- Lease
- Mths in Lease
- Mnthly Payment
- Expires

Selling/Retirement Information
- Date
- Price
- Mileage
- Sold to
- Reason

Insurance Information — 14C
- Carrier
- Codes   Deductible   Expiration

14

| <Browse> | <Softkeys> <Save> | 150528 | NL |

Maint Schedule Codes Repair
- Vehicle Maintenance Schedule
- Schedule Codes
- Vehicle Schedule List
- Schedule Code List The Manufacturer's Maintenance Schedule is part of the Service program. All that need be done is enter the RO screen, scan the VIN, click on 30,000 Maintenance; Automatically 31 detailed P&L line items are entered. An instant estimate takes 2 minutes.
The system can locate & order parts, guide the tech through repairs procedures & record all services for Accounting.

---

Fleet Drivers Assign Vehicle Maint Schedule Codes Repair Exit       *14D*

Make: FORD        Model: ESCORT 4DR S/W LX 15        Year: 1998

| Maint Code | Maint Code Description | Miles | Mths |
|---|---|---|---|
| L8007 | - prepare car for service - | 5000 | 12 |
| L5758 | change oil/ filter | 15000 | 12 |
| L5772 | clean/replace c/c vent filter | 15000 | 12 |
| L1004 | insp coolant hoses/clamps | 15000 | 18 |
| L5928 | insp/adj all drive belts | 30000 | 36 |
| L3608 | clean/replace air cleaner | 30000 | 36 |
| L3014 | replace spark plugs | 30000 | 36 |
| L3604 | adj fuel inj system idle | 15000 | 12 |
| L3503 | insp/complete fuel system | 15000 | 12 |
| L0302 | service fr/disk brakes | 15000 | 12 |
| L0502 | service r/drum brakes | 10000 | 12 |
| L0603 | insp brake lines/hoses/conn | 30000 | 18 |
| L1220 | rotate wheels/tires | 30000 | 18 |

General Maintenance Information

| <Browse> | <Softkeys> <Save> | 150528 | NL |

*Fig. 6*

| Vehicle Entry |
| Vehicle History |
| Vehicle List |
| Vehicle Report |
| Vehicle Lease Cost List |
| Vehicle History - drivers |
| Vehicle History - Sch Maint |
| Needs Maintenance List |

Maintenance due items are transferred from the report viewer to the RO. window in detail just as an in-shop repair order, all one need do is follow instructions and go to work.
The system does all the paperwork

*14E*

```
                   Report Viewer
                  Auto Com Tech (ACT)
        Vehicles Needing Scheduled Maintenance as of 12/15/02
VIN                Year    Make    Model   Items Needing Maintenance
1FASP15J3TW162322  1996    Ford    Escort  change oil/ filter
                                           clean/replace c/c vent filter
                                           insp coolant hoses/clamps
                                           insp/adj all drive belts
                                           clean/replace air cleaner
                                           replace spark plugs
                                           adj fuel inj system idle
                                           insp/complete fuel system
                                           service fr/disk brakes
                                           service rr/drum brakes
                                           insp brake lines/hoses/conn
                                           rotate wheels/tires
                                           inspect front suspension
                                           chg fluid insp steer/gear
                                           inspect body bolts/nuts Use Direction Keys to View Report   |CL  NL |
```

*Fig. 7*

*14F* Factory recalls listing of Automatic notices to Dealers and Owners
*14G* Warranty conditions are listed at time of purchase of vehicle

*Fig. 8*

```
            (1) (2)   (3) (4) (5)  (6) (7) (8) (9)  (10)  (11) (12) (13) (14) (15) (16) (17)
VIN#  3 F   A B P   1 5 P L   W  R 2 0 1 2 0 5
```

A=Haperville, Georgia  M=Cuautitian, Mexico
F=Dearborn, Michigan   R=Hermosillo, Mexico     *14H* 11th Postion=Manufacture Plant
G=Chicago, Illinois    W=Wayne, Michigan
K=Claycomo, Missouri   X=Talbotville, Ontario Canada    *Fig. 9*

```
            (1) (2)   (3) (4) (5)  (6) (7) (8) (9)  (10)  (11) (12) (13) (14) (15) (16) (17)
VIN#  3 F   A B P   1 5 P L   W  R 2 0 1 2 0 5
```

*14I* 10th Postion=Year

| ALL3Mod1 | | |
|---|---|---|
| 1-Attribute:Year | | |
| 2-Rule Number:19 | | |
| 3-Value:L | | |
| 4-Expression:10=W | | |
| Rule | | |
| 13 | 92 | 10=N |
| 14 | 93 | 10=P |
| 15 | 94 | 10=R |
| 16 | 95 | 10=S |
| 17 | 96 | 10=T |
| 18 | 97 | 10=V |
| 19 | 98 | 10=W |
| 20 | 99 | 10=X |
| 21 | 00 | 10=Y |
| 22 | 01 | 10=1 |
| 23 | 02 | 10=2 |
| 24 | 03 | 10=3 |
| (More) Use PgUp/PgDn to display additional Entries | | |

*Fig. 10*

```
          (1) (2)   (3) (4) (5) (6) (7) (8) (9)  (10) (11) (12) (13) (14) (15) (16) (17)
VIN#  3 F  A  B  P  1  5  P  L  W  R  2  0  1  2  0  5
        ↑
      14J  2nd Position=Make
```

| ALL3Mod1 | | ☐ ☐ ☒ |
|---|---|---|
| Vehicle Classification | | |

1-Attribute:Year
2-Rule Number:1
3-Value:FORD
4-Expression:2-3=FA

| Rule | Value | Expression |
|---|---|---|
| 1 | Ford | 2-3=FA |
| 2 | Ford Probe | 2-3=ZV |
| 3 | Ford Festiva | 2-3=NJ |
| 4 | Ford | 2-3=FB |
| 5 | Ford | 2-3=FM |
| 6 | Ford | 2-3=FT |
| 7 | Mercury | 2-3=ZW/ME/MA |
| 8 | Lincoln | 2-3=LN/MMR |
| 9 | Cadillac | 2-3=06/06 |
| 10 | Chevrolet | 2-3=01 |
| 11 | Chevrolet | 2-3=01 |
| 12 | Chevrolet | 2-3=81 |

(More) Use PgUp/PgDn to display additional Entries

*Fig. 11*

```
         (1) (2)   (3) (4) (5) (6) (7) (8) (9) (10) (11) (12) (13) (14) (15) (16) (17)
VIN#  3 F  A B P 1 5 P L W R 2 0 1 2 0 5
                      ↑ ↑
                      | 7th Position=Body Type ⎤
                      |                        ⎬ 14L
                      6th Position=Model/Chassis ⎦
```

```
ALL3Mod1                                              □ ▣ ⊠
                     Vehicle Classification
  1-Attribute:Model
  2-Rule Number:15
  3-Value:ESCORT 4DR SW LX
  4-Expression:2-3=FA & 6-7=15/28/98

Rule    Value              Expression
    13      ESCORT 4DR HB LX   2-3=FA & 6-7=14/95
    14      ESCORT 4DR SED LX  2-3=FA & 6-7=13
    15      ESCORT 4DR SW LX   2-3=FA & 6-7=15/28/98
    16      PROBE 2DR HB GL    2-3=ZV & 6-7=20
    17      PROBE 2DR HB LX    2-3=ZV & 6-7=21
    18      PROBE 2DR HB GT    2-3=ZV & 6-7=22
    19      FOCUS 2DR HB ZXS   2-3=FA & 6-7=31 & 10=Y
    20      FOCUS 4DR SED LX   2-3=FA & 6-7=33 & 10=Y
    21      FOCUS 4DR SED SE   2-3=FA & 6-7=34 & 10=Y
    22      FOCUS 4DR SED ZTS  2-3=FA & 6-7=38 & 10=Y
    23      FOCUS 4DR S/W SE   2-3=FA & 6-7=36 & 10=Y
    24      TEMPO 2DR L        2-3=FA & 6-7=30 & 10=Y ──── (More) Use PgUp/PgDn to display additional Entries ────
```

*Fig. 12*

```
     (1) (2)  (3) (4) (5) (6) (7) (8) (9) (10) (11) (12) (13) (14) (15) (16) (17)
VIN#  3  F   A   B   P   1   5   P   L   W    R    2    0    1    2    0    5
                                    ↑
                                  14M  8th Position=Engine ID
```

```
┌─ ALL3Mod1 ──────────────────────────────────────────────── □ ■ X ┐
│                        Vehicle Classification                     │
│  1-Attribute:Engine                                               │
│  2-Rule Number:22                                                 │
│  3-Value:P=121CI 2.0L L4 EFI                                      │
│  4-Expression:2-3=FA & 8=P & 10=V/W/X/Y/1                         │
│  ┌──────────────────────────────────────────────────────────────┐ │
│  │ Rule  Value                  Expression                      │ │
│  │ 13    G=302CI 5.0L V/8 EFI   2-3=FA/ME & 8=G & 10=P           │ │
│  │ 14    H= 81CI 1.3L SFI       2-3=FA/NJ & 8=H                  │ │
│  │ 15    J=114CI 1.9L L4 SFI    2-3=FA/ME & 8=J                  │ │
│  │ 16    K= 81CI 1.3L 2B FESTIVA 2-3=NJ & 8=K                    │ │
│  │ 17    L=133CI 2.2L FI TURBO  2-3=ZV & 8=L                     │ │
│  │ 18    L=155CI 2.5L DOHC 24V FI 2-3=FA/ZW/ME & 8=L             │ │
│  │ 19    M=140CI 2.3 L4 EFI     2-3=FA/ME & 8=M                  │ │
│  │ 20    N=153CI 2.5L 4L EFI    2-3=FA/ME & 8=N & 10=K/L/M       │ │
│  │ 21    N=207CI 3.4L V/8 EFI SHO 2-3=FA & 8=N & 10=T/V/W/X/Y    │ │
│  │ 22    P=121CI 2.0L L4 EFI    2-3=FA & 8=P & 10=V/W/X/Y/1      │ │
│  │ 23    P=195CI 3.2L V/6 DOHC FI 2-3=FA/LA/ME & 8=P & 10=L/M/N/P/R/S │ │
│  │ 24    R=232CI 3.8L V/6 EFI SC 2-3=FA/LN/ME & 8=R              │ │
│  └──────────────────────────────────────────────────────────────┘ │
│          ──── (More) Use PgUp/PgDn to display additional Entries ──── │
└───────────────────────────────────────────────────────────────────┘
```

*Fig. 13*

```
            (1) (2)  (3) (4) (5) (6) (7) (8) (9) (10) (11) (12) (13) (14) (15) (16) (17)
VIN#  3 F  A B P 1 5 P L W R 2 0 1 2 0 5
                                          ↑
                                  12-17=Sequence Number 14N
```

Fig. 14

| FMW010 - Fleet Maintenance | | | |
|---|---|---|---|
| Vehicle #: 150528 | License No: FHA-326 | Accessories | |
| | License Expires:01/10/99 | AM/FM/CA | |
| VIN: 3FALP15P7WR150528 | Inspection Expires:01/10/99 | AC | |
| Make: FORD | | ABS | |
| Model: ESCORT | Wheels ID: | PB,PS,AT | 140 |
| Year: 1998 | Color: WHITE | | |

Fig. 15

```
| Fleet Drivers Assign Vehicles Maint Schedule Codes Repair Exit |
```

Vehicle #: 15322        License No: OUB-16G         Accessories
                        License Expires:            PB,PS,AT
VIN: 3FALP15J3TW162322  Inspection Expires:         AM/FM
Make: FORD                                          AC
Model: ESCORT           Wheels ID:                  ABS
Year: 1996              Color: WHITE                2/W

| Driver              | Date Assigned        |
| Mileage      8      | Current Status       |
| Location MIRAMAR-H  | OFFICE HEADQUARTERS  |

| Maint Code | Description | Previous Miles | Maint Date | Miles Remain Maint | Next Maint Due |
|---|---|---|---|---|---|
| L8007 | – prepair car for service – | 8 | 03/11/96 | | |
| L5758 | change oil/ filter | 15,525 | 09/09/96 | 20,517 | 20,525 |
| L5772 | clean/replace c/c vent filter | 15,525 | 09/09/96 | 30,517 | 30,525 |
| L1004 | insp coolant hoses/clamps | 8 | 05/07/96 | 15,000 | 15,008 |
| L5928 | insp/adj all drive belts | 8 | 05/07/96 | 15,000 | 15,008 |
| L3608 | clean/replace air cleaner | 8 | 05/07/96 | 30,000 | 30,008 |
| L3014 | replace spark plugs | 8 | 05/07/96 | 30,000 | 30,008 |

| <Browse> | <Options> <Softkeys> <Save> |150528  | CL NL |

_14P_

| Report Viewer |
|---|

| COMPANY: FMS | Auto Com Tech (ACT) |
| | Scheduled Maintenance History for 1996 |
| | as of 12/15/02 |

| Vehicle ID | Maint Code | Maint Miles | Maint Date | Repair Shop Code | Repair Shop Name |
|---|---|---|---|---|---|
| 15322 | L8007 | 8 | 03/11/96 | ALL | Auto Com Tech (ACT) |
|  | L1202 | 8 | 03/11/96 | ALL | Auto Com Tech (ACT) |
|  | L5758 | 15,525 | 09/09/96 | ALL | Auto Com Tech (ACT) |
|  |  | 3,254 | 04/29/96 | ALL | Auto Com Tech (ACT) |
|  | L5772 | 15,525 | 09/09/96 | ALL | Auto Com Tech (ACT) |
|  |  | 3,254 | 04/29/96 | ALL | Auto Com Tech (ACT) |

| Use Direction Arrows to View Report | CL NL |

*Fig. 16*

```
REV.EXE                                                              ▢▢☒
                          Parts Maintenance
Vehicle #: 15322
                                                                     14Q
1-Part Number      000000306
2-Category         000000300      -- F/DISC & DRUM BRAKES --
3-Description      FRONT BRAKE PADS
4-Line Number      1
5-Application      ESCORT 98/99 8=P/3 F/PADS
6-Match Rule       2-3=FA & 6=1 & 8=P/3 & 10=W/X
7-Factory Number   XS4Z-2001-AA 14R
8-Unit Cost        24.26
9-List Price       67.57

Line Application              Match Rule          Factory Part #   Cost    List
     1 ESCORT 98/99 8=P/3 F/>>2-3=FA & 6=1 & 8=P/3 &>>XS4Z-2001-AA    24.26   67.57
     2 ESCORT 97 8=P F/PADS 2-3=FA & 6=1 & 8=P & 1>>F7CZ-2001-BA      24.26   67.57
     3 ESCORT 91/93 8=8/J F/>>2-3=FA & 6=1 & 8=8/J &>>F4CZ-2001-A     15.44   46.27
     4 ESCORT 91/96 & 8=8/J >>2-3FA & 6=1 & 8=J/8 &>>F4CZ-2001-B      15.44   46.27
     5 ESCORT 89/90 F/PADS 2-3=FA & 6=9 & 10=K/L E8FZ-2001-A          12.24   35.82
     6 MUSTANG 90/92 8=M F/P>>2-3=FA & 6=4 & 8=M & 1>>E3SZ-2001-B     15.74   46.67
     7 MUSTANG 93 8=M F/PADS 2-3=FA & 6=4 & 8=M & 1>>F3ZZ-2001-A      14.65   41.79
                                                                      14T    14U
                   ─── (More) Use PgUp/PgDn to display additional entries ───
```

*Fig. 17*

| REV.EXE | | | | □▣⊠ |
|---|---|---|---|---|
| | *14Q* Parts Maintenance | | | |

Vehicle #: 15322

1-Part Number
2-Category
3-Description
4-Line Number
5-Application
6-Match Rule
7-Factory Number
8-Unit Cost
9-List Price

| Line Application | Factory Part # | Cost | List |
|---|---|---|---|
| 1 ESCORT 98/99 8=P/3 F/PADS | XS4Z-2001-AA | 24.26 | 67.57 |
| 2 ESCORT 97 8=P F/PADS | F7CZ-2001-BA | 24.26 | 67.57 |
| 3 ESCORT 91/93 8=8/J F/PADS | F4CZ-2001-A | 15.44 | 46.27 |
| 4 ESCORT 91/96 & 8=8/J F/PADS | F4CZ-2001-B | 15.44 | 46.27 |
| 5 ESCORT 89/90 F/PADS | E8FZ-2001-A | 12.24 | 35.82 |
| 6 MUSTANG 90/92 8=M F/PADS | E3SZ-2001-B | 15.74 | 46.67 |
| 7 MUSTANG 93 8=M F/PADS | F3ZZ-2001-A | 14.65 | 41.79 |
| 8 MUSTANG 89/93 8=E F/PADS | F0ZZ-2001-A | 15.55 | 46.67 |
| 9 MUSTANG 94/97 8=T/W/4 F/PADS | F4ZZ-2001-A | 14.65 | 41.79 |
| 10 MUSTANG 94/99 8=D/V F/PADS | F5ZZ-2001-A | 14.65 | 41.79 |
| 11 MUSTANG 99/00 8=W/X/4 F/PADS | XR3Z-2001-AA | 14.65 | 41.79 |
| 12 * | 000306 | .00 | .00 |
| 13 PROBE 90/92 F/PADS | F42Z-2001-2 | 16.46 | 41.79 |
| 14 PROBE 93/6/7 F/PADS | F62Z-2001-AA | 16.46 | 41.79 |
| 15 PROBE 94/95 F/PADS | F62Z-2201-BA | 16.46 | 41.79 |
| 16 FESTIVA 88/93 F/PADS | E8BZ-2001 B | 24.84 | 67.57 |
| 17 ASPIRE 94/97 F/PADS | F4BZ-2001 -A | 15.22 | 46.27 |
| *14R* | | *14T* | *14U* |

Line Appli
1 ESCO
2 ESCO
3 ESCO
4 ESCO
5 ESCO
6 MUST
7 MUST

Type item number; or use arrows, PgUp, PgDn to select; then press Enter

*Fig. 18*

Comparing regular Directories with Digital Directories (DMD) proves an old adage; a picture is worth a thousand words. Speed-key selections from F1=? F2=M? F3=L? F4=P? provide directories used for DMD single Part and labor entries or Macro Combination entries. Instructions for using the directories are explained below.

```
                        REPAIR ORDERS
                       ┌─────── LABOR IN CATEGORY 000001200 ─┐
              ITEM  OPERNO    DESCRIPTION
  1-Cust:20    1   000001200  --- FRONT SUSPENSION ---
  4-RO  :32    2   000001201  *** CUSTOMER COMPLAINT ***
  9-VIN :3F    3   000001202  *** CUSTOMER REQUEST ***
  13-Eng :P    4   000001203  -- CONDITION FR/SUSPENSION --
  17-Mile:32   5   000001204  ** SERVICE FRT/SUSPENSION **
               6   000001206  LUBRICATE FRT/SUSPENSION
  21-Line:9    7   000001208  TIGHTEN/LUBE/ADJ/SUSPENSION
  24-Done:Y    8   000001210  FREE-UP/LUBE/ADJ/SUSPENSION
               9   000001212  REMOVE FRONT VIBRATION
  ┌Ln  Code┐  10   000001214  BALANCE FRONT WHEELS
  │ 1  L0000│ 11   000001216  ROTATE ALL 4 WHEELS
  │ 2  L0000│ 12   000001218  BALANCE ALL 4 WHEELS
  │ 3  L0000│ 13   000001220  *** ALIGN FRONT END ***
  │ 4  L0000│ 14   000001222  CORRECT PULL TO RIGHT
  │ 5  L0000│ 15   000001224  CORRECT PULL TO LEFT
  │ 6  L0000│ 16   000001226  LEVEL/SHIM FRT/SUSPENSION
  │ 7  L0000│ 17   000001228  CORRECT RETURN TO CENTER
  TOTALS:
  Type item number; or use arrows, PgUp, PgDn to select; then press Enter REPAIR ORDERS
                       ┌─────── MACROS IN CATEGORY 000001200 ─┐
              ITEM  OPERNO    DESCRIPTION
  1-Cust:20   26   000001254  Replace Stabilizer Bushings
  4-RO  :32   27   000001256  Replace Stabilizer Link Kits
  9-VIN :3F   28   000001258  Replace Stabilizer Bar
  13-Eng :P   29   000001260  Replace Front Spring (R)
  17-Mile:32  30   000001261  Replace Front Spring (L)
              31   000001262  Replace Upper Ball Joint (R)
  21-Line:9   32   000001263  Replace Upper Ball Joint (L)
  24-Done:Y   33   000001264  Replace Lower Ball Joint (R)
              34   000001265  Replace Lower Ball Joint (L)
  ┌Ln  Code┐  35   000001266  Rebush Upper Control Arm (R)
  │ 1  L0000│ 36   000001267  Rebush Upper Control Arm (L)
  │ 2  L0000│ 37   000001268  Replace Up/Control Arm (R)
  │ 3  L0000│ 38   000001269  Replace Up/Control Arm (L)
  │ 4  L0000│ 39   000001270  Replace Up/Pitman Shaft (R)
  │ 5  L0000│ 40   000001271  Replace Up/Pitman Shaft (L)
  │ 6  L0000│ 42   000001273  Rebush Loser Control Arm (L)
  │ 7  L0000│ 42   000001273  Rebush Loser Control Arm (L)
  TOTALS:
  Type item number; or use arrows, PgUp, PgDn to select; then press Enter
```

*Fig. 19A*

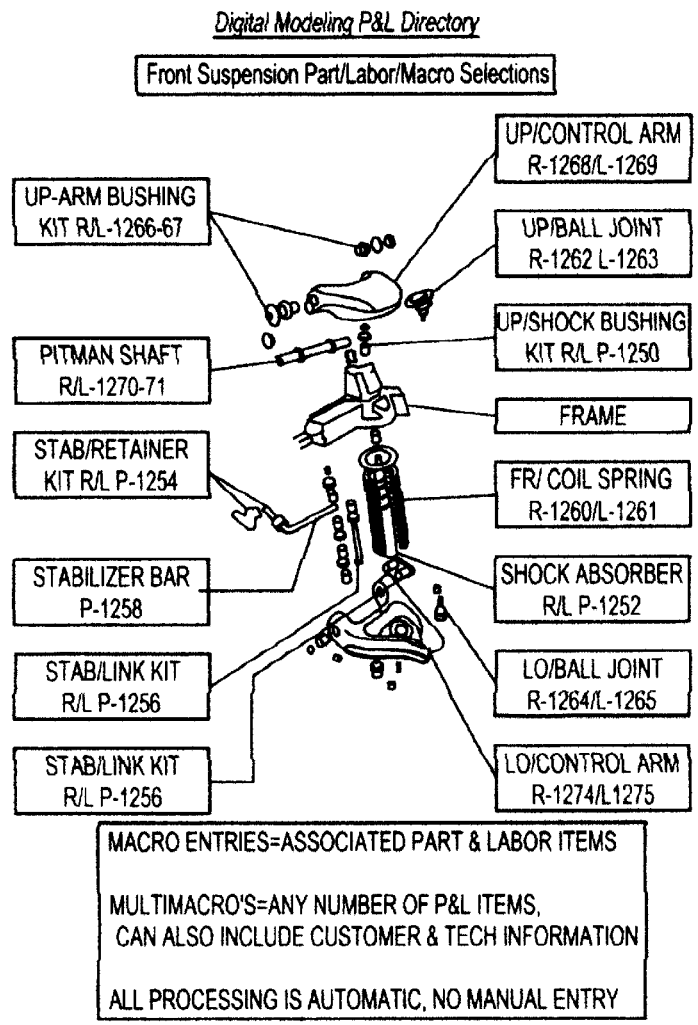

Selecting F1=? F2=M? F3=L? F4=P? produces regular directories similar to the Labor and macro directories above, selections are made by entering a directory line number or by highlighting a line item for entry. For DMD Entries, select F1=? F2=M? F3=L? F4=P? F3=Labor F4= Parts for separate items, select, Point, and click. For multiple items select F2 Macro or build a macro simply pointing and clicking on selected items, or go to the formulated macro directory, select macros of choice and enter. End results, Automatic detailed entries are made. if one is not familiar with the formulation of macros, then Digital Modeling Directories are used to formulate macros for collision damage reports. DMDs have multiple damage variable that show a more detailed examination than is possible in a physical examination. For instance, overlapping components or assemblies are visually "removed" to reveal how concealed components were affected in the crash. ACT takes advantage of this factor when creating instant estimates with combinations or associated P&L macros. "The system guides you through".

*Fig. 19B*

1-Cust:201205    AUTO COM TECH (ACT)              2-CLASS:P      3-TAXED:Y
4-RO :32607      5-STATUS:0       6-DATE:12/06/02  7-PARTS:100    8-LABOR:58.00
9-VIN :3FABP15PLWR201205    10-YR:98  11-MAKE:FORD  12-MOD:ESCORT 4DR SW LX
13-Eng :P=121CI 2.0L L4 EFI           14-TRAN:AT-OD  15-COLOR:WHT  16-TRIM:GRY
17-Mile:32421    18-LICENSE:ALN-329   19-PMT:ACCT    20-PMT #:

21-Line:7    22-CODE:P000000306    23-WARR:NO       FRONT BRAKE PADS
24-Done:Y    27-QTY:1              28-LIST:67.57    COST=24.26  FACT#=XS4Z-2001-AA

| Ln | Code | Description | Mech | Quan | Price | Total | W | D |
|---|---|---|---|---|---|---|---|---|
| 1 | L000003800 | *** CUSTOMER REQUEST *** | 146 | .00 | 58.00 | .00 | | Y |
| 2 | L000000302 | ** SERVICE F/DISC BRAKES ** | 146 | .00 | 58.00 | .00 | | Y |
| 3 | L000000306 | REPLACE FRONT BRAKE PADS | 146 | 1.40 | 58.00 | 81.20 | | Y |
| 4 | L000000314 | O/H FRONT BRAKE CALIPER/S | *14W* | 1.00 | 58.00 | 58.00 | | Y |
| 5 | L000000312 | REPLACE F/BRAKE ROTOR/S | 146 | .00 | 58.00 | 23.20 | | Y |
| 6 | L000000320 | BLEED FR/BRAKE SYSTEM | 146 | .00 | 58.00 | 11.60 | | Y |
| 7 | L000000306 | FRONT *14Y* | 146 | 1.00 | 67.57 | 67.57 | | Y |
| 8 | L000000314 | FRONT | 146 | 1.00 | 11.85 | 11.85 | | Y |
| 9 | L000000312 | FRONT ROTOR (PAIRS ONLY) | *14X* | 2.00 | 48.64 | 97.28 | | Y |
| 10 | L000000001 | ----------- | 146 | .00 | 58.00 | .00 | | Y |
| 11 | L000000502 | ** SERVICE R/DRUM BRAKES ** | 146 | .00 | 58.00 | .00 | | Y |
| 12 | L000000506 | REPLACE REAR BRAKE SHOES | 146 | 1.50 | 58.00 | 87.00 | | Y |
| 13 | L000000511 | C-MACHINE REAR DRUMS | 146 | .60 | 58.00 | 34.80 | | Y |
| 14 | L000000505 | C-CLEAN/LUBE/BLEED & ADJ | 146 | .00 | 58.00 | .00 | | Y |
| 15 | P000000506 | REAR BRAKE SHOES | | 1.00 | 35.82 | 35.82 | | Y |
| 16 | P000000680 | BRAKE FLUID | | 1.00 | 3.00 | 3.00 | | Y |

*14Z*

──── (More) Use PgUp/PgDn to display additional Entries ────

TOTALS:   LABOR= 295.80   PARTS= 215.52   TAX= 33.24   TOTAL 544.56

*Fig. 20*

1-Cust:201205    AUTO COM TECH (ACT)                    2-CLASS:P      3-TAXED:Y
4-RO :32607         5-STATUS:0         6-DATE:12/06/02  7-PARTS:100    8-LABOR:58.00
9-VIN :3FABP15PLWR201205    10-YR:98   11-MAKE:FORD     12-MOD:ESCORT 4DR SW LX
13-Eng :P=121CI 2.0L L4 EFI            14-TRAN:AT-OD    15-COLOR:WHT   16-TRIM:GRY
17-Mile:32421       18-LICENSE:ALN-329 19-PMT:ACCT      20-PMT #:

| Ln | Code | Description | Mech | Quan | Price | Total | W | D | S | F |
|----|------|-------------|------|------|-------|-------|---|---|---|---|
| 1 | L000003800 | *** CUSTOMER REQUEST *** | 146 | .00 | 58.00 | .00 | | Y | | |
| 2 | L000000302 | ** SERVICE F/DISC BRAKES ** | 146 | .00 | 58.00 | .00 | | Y | | |
| 3 | L000000306 | REPLACE FRONT BRAKE PADS | 146 | 1.40 | 58.00 | 81.20 | | Y | Y | |
| 4 | L000000310 | MACHINE F/BRAKE ROTORS | 146 | .00 | 58.00 | .00 | | Y | | |
| 5 | L000000320 | BLEED FR/BRAKE SYSTEM | 146 | .20 | 58.00 | 11.60 | | Y | | |
| 6 | L000000306 | FRONT BRAKE PADS | | 1.00 | 67.57 | 65.57 | | Y | - | - |
| 7 | L000000680 | BRAKE FLUID | | *14Z* 3.00 | 3.00 | | Y | - | - | |

21-LINE:5         DO YOU WISH TO START LINE 5 (YES/NO) ? :
                  *14Y*

A technician enters an assigned line number to time In or Out, pressing F1=Yes to start the clock or F2=No to stop the clock, doing so records actual repair time. Flat-rate time is factory assigned time. Comparing the times, Management can see if a flat rate job of 1 hour is taking 2 hours or if other problems exist. This gives management the data necessary to make changes that provide better time schedules among the technicians and solves problems that are normally hidden in regular shop procedures. It also singles out technicians that need more job training

*Fig. 21*

INTEGRATED VEHICLE INFORMATION SYSTEM

BACKGROUND OF THE INVENTION

1. Field of the Invention

The present invention relates to an integrated vehicle information system. More particularly, the present invention relates to an integrated vehicle information system containing a central server and remote computers to access said information.

2. Description of the Prior Art

Numerous innovations for vehicle information systems have been provided in the prior art that are described as follows. Even though these innovations may be suitable for the specific individual purposes to which they address, they differ from the present invention as hereinafter contrasted.

In U.S. Pat. No. 6,076,026, titled, Method and device for vehicle control events data recording and securing, invented by Jambhekar, et. al., a device (100) and method (200, 300) authenticate and secure control event data for a vehicle, wherein the device includes: A) a microcontroller (104), coupled to receive control event information, for attaching a first time stamp and vehicle identification number VIN to the control event information to provide first information and sending the first information to memory (106) in time overlap fashion; B) the memory (106), coupled to the microcontroller (104) and a microprocessor (108), for storing first information and second information in time overlap fashion; and C) the microprocessor (108), coupled to the memory (106) and a plurality of transducers (110), for determining whether received impact data varies from previous impact data, and where received impact data varies, adding a second time stamp and VIN to the received impact data to form second information.

In U.S. Pat. No. 6,070,164, titled, Database method and apparatus using hierarchical bit vector index structure, invented by Vagnozzi, a database having fixed length records stored together in record number order and an index structure for the database. The index structure comprises a separate index for each searchable field of the records. For purposes of indexing, the records are logically divided into fine slices of 8,000 records each, and the fine slices are grouped into coarse slices of 4,000 fine slices each. The indexes include fine and coarse keys, each of which corresponds to a particular data value and a particular fine or coarse slice. Associated with each key is a link that is used to determine which records contain the data value. For the fine keys, the link includes a pointer to a bit vector that has a single bit for each of the records within the fine slice associated with the key. For the coarse keys, the link includes a pointer to a bit vector that has a single bit for each of the fine slices contained in the coarse slice. The coarse bit vector comprises two bit vectors, one that identifies which of the fine slices within the coarse slice contains any records having the data value and one that identifies which fine slices, if any, contain the data value in every one of its records. The keys are stored in a B-tree in order of a unique key value so that they are processed in record number order and the resulting list of records for any query is generated in record number order.

In U.S. Pat. No. 6,052,065, titled, reading and transmitting system, Invented by Glover, a new VIN Reading and Transmitting System for providing a device for automatically detecting a vehicle identification number and transmitting the number to a dispatch station for immediate identification of the vehicle and owner. The inventive device includes a vehicle unit containing the vehicle identification number, a portable unite which enables the vehicle unit to transmit the number which is detected by the portable unit, a digital repeater which receives a signal from the portable unit for transmitting to a receiver at the dispatch office where the number can be utilized to disclose the vehicle and the owner which can be transmitted to the police officer immediately.

The aforementioned patents differ from the present invention because the patented inventions do not describe and/or claim the following: wireless and/or Internet communication means; logical expression containing field derivation rules In an active knowledge based system; and vehicle identification number (VIN) which consists of a series of expressions of the form "position=contents" cross linking the first ten digits of the VIN to a data base having data such as manufacture place, year, car modal and make and type, and engine size to vehicle history, maintenance schedules, maintenance due from mileage calculations, factory recalls etc.

Numerous innovations for vehicle information systems have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to an integrated vehicle information system. More particularly, the present invention relates to an integrated vehicle information system containing a central server and remote computers to access said information.

The types of problems encountered in the prior art are vehicle identification systems lack pertinent information.

In the prior art, unsucessful attempts to solve this problem were attempted namely: vehicle information systems which are localized. However, the problem was solved by the present invention because it contains a database accessible through a communications means.

Innovations within the prior art are rapidly being exploited to facilitate gathering information on vehicles.

The present invention solved a long felt need for a fully integrated vehicle identification system.

Accordingly, it is an object of the present invention to provide a integrated vehicle information system having a vehicle identification number and a database.

More particularly, it is an object of the present invention to provide the vehicle identification number having the following segments: vehicle identification number make, vehicle identification number model, vehicle identification number engine, vehicle identification number year, and vehicle identification number factory sequence number.

In keeping with these objects, and with others which will become apparent hereinafter, one feature of the present invention resides, briefly stated, in the database having place of vehicle purchase, vehicle financing, vehicle insurance, maintenance schedule, maintenance due from mileage calculation, factory recall, warranty, place of manufacture, model year, make, model, engine size, factory sequence number, special features, vehicle repair & history, parts description, parts identification numbers, parts microfiche images and assembly, parts wholesale cost, parts retail cost, step-by-step technician repair guide, repair technician, technician assignment, technician actual repair time, technician flat rate repair time, vehicle image, current owner information, and previous owner information.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—integrated vehicle information system (10)
12—vehicle identification number (12)
12A—vehicle identification number make (12A)
12B—vehicle identification number model (12B)
12C—vehicle identification number engine (12C)
12D—vehicle identification number year (12D)
12E—vehicle identification number factory sequence number (12E)
14—database (14)
14A—place of vehicle purchase (14A)
14B—vehicle financing (14B)
14C—vehicle insurance (14C)
14D—maintenance schedule (14D)
14E—maintenance due from mileage calculation (14E)
14F—factory recall (14F)
14G—warranty (14G)
14H—place of manufacture (14H)
14I—model year (14I)
14J—make (14J)
14K—model (14L)
14M—engine size (14M)
14N—factory sequence number (14N)
14O—special features (14O)
14P—vehicle repair & history (14P)
14Q—parts description (14Q)
14R—parts identification numbers (14R)
14S—parts microfiche images and assembly (14S)
14T—parts wholesale cost (14T)
14U—parts retail cost (14U)
14V—step-by-step technician repair guide (14V)
14W—repair technician (14W)
14X—technician assignment (14X)
14Y—technician actual repair time (14Y)
14Z—technician flat rate repair time (14Z)
14AA—vehicle image (14AA)
14AB—current owner information (14AB)
14AC—previous owner information (14AC)

BRIEF DESCRIPTION OF THE DRAWINGS

FIG. 1 is a view of a vehicle identification number (12).

FIGS. 2A and 2B are the configurations of Fields, Values and Rules.

FIGS. 3, 9–14 are the views of a vehicle identification number (12) in detail.

FIGS. 4 and 5 are a database.

FIG. 6 is a maintenance schedule.

FIGS. 7 and 8 are a maintenance due from mileage calculation, factory recalls and warranty condition.

FIG. 15 is a fleet maintenance.

FIG. 16 is a vehicle repair and history.

FIGS. 17 and 18 are the part maintenance.

FIG. 19A is the repair orders.

FIG. 19B is the parts microfiche images and assembly.

FIGS. 20 and 21 are the step-by-step technician repair guide.

DESCRIPTION OF THE PREFERRED EMBODIMENT

An integrated vehicle information system (10) comprising: a computer which comprises an operating system, random access memory, power means, processor, communication means, display, entry means, and storage means containing a database (14) which comprises the following fields: place of vehicle purchase (14A), vehicle financing (14B), vehicle insurance (14C), maintenance schedule (14D), maintenance due from mileage calculation (14E), factory recall (14F), warranty (14G), place of manufacture (14H), model year (14I), make (14J), model (14L), engine size (14M), factory sequence number (14N), special features (14O), vehicle repair & history (14P), parts description (14Q), parts identification numbers (14R), parts microfiche images and assembly (14S), parts wholesale cost (14T), parts retail cost (14U), step-by-step technician repair guide (14V), repair technician (14W), technician assignment (14X), technician actual repair time (14Y), technician flat rate repair time (14Z), vehicle image (14AA), current owner information (14AB), and previous owner information (14AC).

Figure 1:
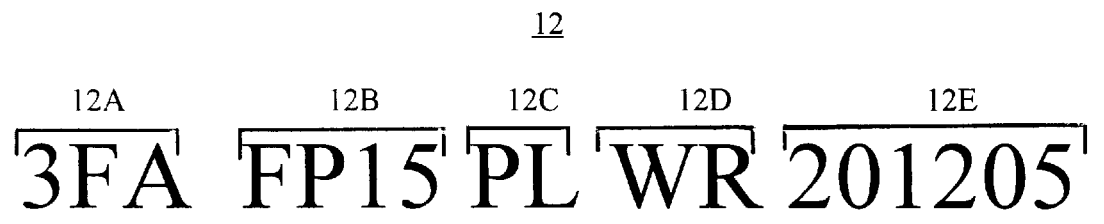

Referring to FIG. 1 which is a view of a vehicle Identification number (12) which comprises identification representing a vehicle identification number make (12A), Vehicle identification number modal (12B), vehicle identification number engine (12C), vehicle identification year (12D), and vehicle identification number factory sequence number (12E).

The integrated vehicle information system (10) further comprises software contained within the computer. The software having the following steps:

1) first entering (112) in the vehicle identification number (12), ii) separating (114) the vehicle identification number (12) into segments consisting of vehicle identification number make (12A), vehicle identification number modal (12B), vehicle identification number engine (12C), vehicle identification number year (12D), and vehicle identification number factory sequence number (12E), iii) comparing (116) the segments of the vehicle identification number (12) to the data base (14), and iv) first displaying (118) information selected from a group consisting of place of vehicle purchase (14A), vehicle financing (14B), vehicle insurance (14C), maintenance schedule (14D), maintenance due from mileage calculation (14E), factory recall (14F), warranty (14G), place of manufacture (14H), model year (14I), make (14J), model (14L), engine size (14M), factory sequence number (14N), special features (14O), vehicle repair & history (14P), parts description (14Q), parts identification numbers (14R), parts microfiche images and assembly (14S), parts wholesale cost (14T), parts retail cost (14U), step-by-step technician repair guide (14V), repair technician (14W), technician assignment (14X), technician actual repair time (14Y), technician flat rate repair time (14Z), vehicle image (14AA), current owner information (14AB), and previous owner information (14AC).

The software further comprises the following step:

A) second entering (120) information into the database (14), the information entered is from a group consisting of place of vehicle purchase (14A), vehicle financing (14B), vehicle insurance (14C), maintenance schedule (14D), maintenance due from mileage calculation (14E), factory recall (14F), warranty (14G), place of manufacture (14H), model year (14I), make (14J), model (14L), engine size (14M), factory sequence number (14N), special features (14O), vehicle repair & history (14P), parts description (14Q), parts identification numbers (14R), parts microfiche images and assembly (14S), parts wholesale cost (14T), parts retail cost (14U), step-by-step technician repair guide (14V), repair technician (14W), technician assignment (14X), technician actual repair time (14Y), technician flat rate repair time (14Z), vehicle image (14AA), current owner information (14AB), and previous owner information (14AC).

The software further comprises an accounting software integrated with the database. The accounting software consisting of billing, payroll and part inventory Entries can be made as a single part and/or labor item or globally modifying all information on any number of parts or labor items. The system establishes parts description, parts identification numbers, cost, tech assignment, tech time both factual and flat rate. All information can be shown in any format on any form, work sheet, estimate, and/or repair order. Information collected is then used for general accounting, payroll, and part inventory.

The software further comprises diagnostic and repair software integrated with the database. The diagnostic and repair software reveals diagnostic codes and repair information that pertains to each vehicle make and model by displaying information contained within the database (14). The information is selected from a group consisting of maintenance schedule (14D), maintenance due from mileage calculation (14E), factory recall (14F), warranty (14G), vehicle repair & history (14P), parts description (14Q), parts identification numbers (14R), parts microfiche images and assembly (14S), parts wholesale cost (14T), parts retail cost (14U), step-by-step technician repair guide (14V), repair technician (14W), technician assignment (14X), technician actual repair time (14Y), technician flat rate repair time (14Z), vehicle image (14AA), current owner information (14AB), and previous owner information (14AC).

The software further comprises macro operation software integrated with the database. The macro operation software allows the user to enter customer request or complaint information into the vehicle repair & history (14P) field of the database (14). Customer complaints or requests can guide technician through repair procedures, at the same time describe all functions performed, time spent and parts utilized yielding an instant estimate of costs.

The software further comprises VIN—Spec software integrated with the database. The VIN—Spec software identifies the vehicle to which a particular part and/or labor item applies by querying the vehicle identification number (12) and displaying items from a group consisting of in parts description (14Q), parts identification numbers (14R), parts microfiche images and assembly (14S), parts wholesale cost (14T), parts retail cost (14U), step-by-step technician repair guide (14V), repair technician (14W), technician assignment (14X), technician actual repair time (14Y), and technician flat rate repair time (14Z). Identifies the vehicle to which a particular part and/or labor item applies. All part items and labor operations are automatically selected. If multiple matches exist, only the matching parts will appear in the selection window.

The software further comprises automated parts department software integrated with the database, the automated parts department software consisting of the following steps:

A) third entering (122) the vehicle identification number (12),

B) first querying (124) the model year (14I), make (14J), model (14L), and engine size (14M) in the database (14), C) second displaying (126) an in-house work order, D) fourth entering (128) the parts description (14Q) or parts identification numbers (14R), E) second querying (130) the parts description (14Q) and parts identification numbers (14R) to determine if the part requested is in stock, F) third displaying (132) that the part requested is in stock, if the part requested is not in stock, the automated parts department software sends a part order through the communications means to a parts distributor.

The software may optionally contain sales presentations arranged in stages: one, two or three can be provided in any format requested. All information is at the user's fingertips. Projector showcase with pictures of actual vehicle, warranty, maintenance information, financing, insurance etc. A communication and satisfaction relationship is created between customer and dealer.

It will be understood that each of the elements described above, or two or more together, may also find a useful application in other types of constructions differing from the type described above.

While the invention has been illustrated and described as embodied in a vehicle information system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An integrated vehicle information system (10) comprising:

A) a computer which comprises an operating system, random access memory, power means, processor, communication means, display, entry means, and storage means containing a database (14) which comprises the following fields: place of vehicle purchase (14A), vehicle financing (14B), vehicle insurance (14C), maintenance schedule (14D), maintenance due from mileage calculation (14E), factory recall (14F), warranty (14G), place of manufacture (14H), model year (14I), make (14J), model (14L), engine size (14M), factory sequence number (14N), special features (14O), vehicle repair & history (14P), parts description (14Q), parts identification numbers (14R), parts microfiche images and assembly (14S), parts wholesale cost (14T), parts retail cost (14U), step-by-step technician repair guide (14V), repair technician (14W), technician assignment (14X), technician actual repair time (14Y), technician flat rate repair time (14Z), vehicle image (14AA), current owner information (14AB), and previous owner information (14AC);

B) a vehicle identification number (12) which comprises indicia representing a vehicle identification number make (12A), vehicle identification number model (12B), vehicle identification number engine (12C), vehicle identification number year (12D), and vehicle identification number factory sequence number (12E); and C) software contained within the computer, the software having the following steps:
  I) first entering (112) in the vehicle identification number (12),
  ii) separating (114) the vehicle identification number (12) into segments consisting of vehicle identification number make (12A), vehicle identification number model (12B), vehicle identification number engine (12C), vehicle identification number year (12D), and vehicle identification number factory sequence number (12E),
  iii) comparing (116) the segments of the vehicle identification number (12) to the database (14), and
  iv) first displaying (118) information selected from a group consisting of place of vehicle purchase (14A), vehicle financing (14B), vehicle insurance (14C), maintenance schedule (14D), maintenance due from mileage calculation (14E), factory recall (14F), warranty (14G), place of manufacture (14H), model year (14I), make (14J), model (14L), engine size (14M), factory sequence number (14N), special features (14O), vehicle repair & history (14P), parts description (14Q), parts identification numbers (14R), parts microfiche images and assembly (14S), parts wholesale cost (14T), parts retail cost (14U), step-by-step technician repair guide (14V), repair technician (14W), technician assignment (14X), technician actual repair time (14Y), technician flat rate repair time (14Z), vehicle image (14AA), current owner information (14AB), and previous owner information (14AC).

2. The integrated vehicle information system (10) as described in claim 1, wherein the software comprises the following step:
  A) third entering (120) information into the database (14), the information entered is from a group consisting of place of vehicle purchase (14A), vehicle financing (14B), vehicle insurance (14C), maintenance schedule (14D), maintenance due from mileage calculation (14E), factory recall (14F), warranty (14G), place of manufacture (14H), model year (14I), make (14J), model (14L), engine size (14M), factory sequence number (14N), special features (14O), vehicle repair & history (14P), parts description (14Q), parts identification numbers (14R), parts microfiche images and assembly (14S), parts wholesale cost (14T), parts retail cost (14U), step-by-step technician repair guide (14V), repair technician (14W), technician assignment (14X), technician actual repair time (14Y), technician flat rate repair time (14Z), vehicle image (14AA), current owner information (14AB), and previous owner information (14AC).

3. The integrated vehicle information system (10) as described in claim 1, wherein the software further comprises an accounting software integrated with the database, the accounting software consisting of billing, payroll and part inventory.

4. The integrated vehicle information system (10) as described in claim 1, wherein the software further comprises diagnostic and repair software integrated with the database, the diagnostic and repair software reveals diagnostic codes and repair information that pertains to each vehicle make and model by displaying information contained within the database (14), the information is selected from a group consisting of maintenance schedule (14D), maintenance due from mileage calculation (14E), factory recall (14F), warranty (14G), vehicle repair & history (14P), parts description (14Q), parts identification numbers (14R), parts microfiche images and assembly (14S), parts wholesale cost (14T), parts retail cost (14U), step-by-step technician repair guide (14V), repair technician (14W), technician assignment (14X), technician actual repair time (14Y), technician flat rate repair time (14Z), vehicle image (14AA), current owner information (14AB), and previous owner information (14AC).

5. The integrated vehicle information system (10) as described in claim 1, wherein the software further comprises macro operation software integrated with the database, the macro operation software allows the user to enter customer request or complaint information into the vehicle repair & history (14P) field of the database (14).

6. The integrated vehicle information system (10) as described in claim 1, wherein the software further comprises VIN—Spec software integrated with the database, the VIN—Spec software identifies the vehicle to which a particular part and/or labor item applies by querying the vehicle identification number (12) and displaying items from a group consisting of in parts description (14Q), parts identification numbers (14R), parts microfiche images and assembly (14S), parts wholesale cost (14T), parts retail cost (14U), step-by-step technician repair guide (14V), repair technician (14W), technician assignment (14X), technician actual repair time (14Y), and technician flat rate repair time (14Z).

7. The integrated vehicle information system (10) as described in claim 1, wherein the software further comprises automated parts department software integrated with the database, the automated parts department software consisting of the following steps:
  A) fourth entering (122) the vehicle identification number (12),
  B) first querying (124) the model year (14I), make (14J), model (14L), and engine size (14M) in the database (14),
  C) second displaying (126) an in-house work order,
  D) fifth entering (128) the parts description (14Q) or parts identification numbers (14R),
  E) second querying (130) the parts description (14Q) and parts identification numbers (14R) to determine if the part requested is in stock,
  F) third displaying (132) that the part requested is in stock, if the part requested is not in stock, the automated parts department software sends a part order through the communications means to a parts distributor.

* * * * *